(12) United States Patent
Rozman et al.

(10) Patent No.: US 9,143,070 B2
(45) Date of Patent: Sep. 22, 2015

(54) SYSTEMS AND METHODS FOR CONTROLLING TORSIONAL OSCILLATION IN WOUND FIELD SYNCHRONOUS GENERATOR MACHINES

(71) Applicant: Hamilton Sundstrand Corporation, Charlotte, NC (US)

(72) Inventors: Gregory I. Rozman, Rockford, IL (US); Steven J. Moss, Rockford, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 147 days.

(21) Appl. No.: 13/958,082

(22) Filed: Aug. 2, 2013

(65) Prior Publication Data
US 2015/0035501 A1 Feb. 5, 2015

(51) Int. Cl.
H02P 9/02 (2006.01)
H02P 9/10 (2006.01)
H02P 29/00 (2006.01)

(52) U.S. Cl.
CPC .......... *H02P 9/02* (2013.01); *H02P 9/105* (2013.01); *H02P 29/0038* (2013.01)

(58) Field of Classification Search
CPC .................................. H02P 9/105; H02P 23/04
USPC .................................. 322/29, 36, 58
See application file for complete search history.

(56) References Cited

U.S. PATENT DOCUMENTS

| | | | | |
|---|---|---|---|---|
| 5,016,157 A * | 5/1991 | Rozman et al. | ................. | 363/39 |
| 5,218,520 A * | 6/1993 | Rozman et al. | ................. | 363/39 |
| 5,541,488 A * | 7/1996 | Bansal et al. | ................. | 318/801 |
| 6,336,070 B1 | 1/2002 | Lorenz et al. | | |
| 6,717,852 B2 | 4/2004 | Honda et al. | | |
| 7,145,262 B2 * | 12/2006 | Kikuchi et al. | ................. | 290/44 |
| 7,423,411 B2 * | 9/2008 | Sihler | ............. | 322/19 |
| 7,518,344 B2 * | 4/2009 | Sihler | ............. | 322/58 |
| 7,808,215 B2 | 10/2010 | Markunas et al. | | |
| 7,884,581 B2 | 2/2011 | Markunas et al. | | |
| 7,948,197 B2 * | 5/2011 | Shackelford, IV | ........... | 318/611 |
| 8,056,417 B2 * | 11/2011 | Markunas et al. | ............. | 73/650 |

(Continued)

FOREIGN PATENT DOCUMENTS

EP 0070553 A2 1/1983
EP 2216896 A2 8/2010

OTHER PUBLICATIONS

Davis, Roy I. et al., Engine Torque Ripple Cancellation With an Integrated Starter Alternator in a Hybrid Electric Vehicle: Implementation and Control, IEEE Transactions on Industry Applications, vol. 39, No. 6, Nov./Dec. 2003, pp. 1765-1774.

(Continued)

*Primary Examiner* — Julio Gonzalez
*Assistant Examiner* — Sean Gugger
(74) *Attorney, Agent, or Firm* — Locke Lord LLP

(57) ABSTRACT

A method for controlling torsional oscillation includes detecting angular position of a wound field synchronous generator machine, extracting information indicative of torsional oscillation, selecting synchronous torsional oscillations, compensating for the synchronous torsional oscillations with an exciter signal, and controlling field current in the wound field synchronous generator using the exciter signal. A damping controller includes a damping module with a synchronous selective compensator and a synchronous notch filter for generating torsional oscillation compensation signals for asynchronous torsional oscillation.

8 Claims, 4 Drawing Sheets

(56) References Cited

U.S. PATENT DOCUMENTS

| | | |
|---|---|---|
| 8,217,630 B2 | 7/2012 | Markunas et al. |
| 2006/0061319 A1* | 3/2006 | Markunas et al. ............ 318/712 |
| 2007/0222407 A1 | 9/2007 | Sakamoto et al. |
| 2010/0327820 A1* | 12/2010 | Markunas et al. .............. 322/29 |
| 2011/0115444 A1* | 5/2011 | Markunas et al. .............. 322/19 |
| 2014/0375281 A1* | 12/2014 | Hurley et al. ................... 322/19 |

OTHER PUBLICATIONS

Search Report and Opinion issued by the European Patent Office on Jan. 21, 2015 for European Patent Application No. 14177984.

* cited by examiner

SYSTEMS AND METHODS FOR CONTROLLING TORSIONAL OSCILLATION IN WOUND FIELD SYNCHRONOUS GENERATOR MACHINES

BACKGROUND OF THE INVENTION

1. Field of the Invention

The present disclosure relates synchronous machines, and in particular wound field synchronous generator machines.

2. Description of Related Art

Hybrid vehicles utilize electrical power generation systems coupled to variable speed internal combustion engines for propulsion. Such propulsion systems require a highly regulated electrical power supply, typically provided by a wound field synchronous generator machine. The engine couples to the generator through a drivetrain that can include an optional gearbox with an interconnecting shaft. The shaft transmits mechanical energy from the engine through a shaft to rotate a rotating portion of the synchronous machine, thereby generating electricity. A conventional voltage regulator controls the generator to provide a constant output voltage.

The inertias associated with the prime mover and optional gearbox in combination with the mechanical compliance of the drivetrain and synchronous machine rotor, e.g. spring rates, create a distributed mechanical spring-mass system with torsional resonances. As the synchronous machine presents a near constant mechanical load to the drivetrain, the synchronous machine provides negative damping for frequencies within the synchronous machine voltage regulation bandwidth. However, the synchronous machine can be subject to large load transients at frequencies outside of the machine voltage regulation bandwidth. These can alter the mechanical loading on the drivetrain, induce undesirable torsional oscillations in the system, and under certain circumstances, cause mechanical failures in the system.

Similarly, periodic fuel combustion within the engine and the generally nonlinear engine geometry result in torque disturbances and crankshaft speed oscillations that transfer to the rotating part synchronous machine through the drivetrain. These are typically not compensated for with voltage regulation. Instead, conventional vehicle systems incorporate mechanical devices such as a flywheel coupled to the crankshaft to reduce pulsation in the rotational speed of the crankshaft. While generally satisfactory, this adds to vehicle weight and size and adversely affects vehicle efficiency.

Conventional synchronous machines for hybrid vehicles have generally been considered satisfactory for their intended purposes. However, there is a need in the art for systems and methods of damping torsional oscillation in such synchronous machines and vehicle drivetrains without size and weight penalties. There also remains a need in the art for systems and methods of damping torsional oscillation in synchronous machines that are easy to make and use. The present disclosure presents a solution to these needs.

SUMMARY OF THE INVENTION

The subject disclosure is directed to new and useful systems and methods for damping synchronous and asynchronous torsional oscillation in wound field synchronous generator (WFSG) machines.

A method for controlling torsional oscillation includes detecting angular position of a WFSG machine, extracting information indicative of torsional oscillation from the angular position of the WFSG machine, selecting synchronous torsional oscillations from the information indicative of torsional oscillation, compensating for the synchronous torsional oscillations with an exciter signal, and controlling field current in the wound field synchronous generator using the exciter signal. The method can use a synchronous selective compensator for selecting the synchronous torsional oscillations for compensation.

It is contemplated the method can also include selecting asynchronous torsional oscillations and compensating the exciter signal for the asynchronous torsional oscillations. The method can use a synchronous notch filter for selecting the asynchronous torsional oscillations.

A damping controller includes a damping module for damping torsional oscillation in a WFSG machine. The damping module includes a synchronous selective compensator for generating a synchronous torsional oscillation compensation signal, a synchronous notch filter for generating an asynchronous torsional oscillation compensation signal, and an adder module operatively coupled to the synchronous selective compensator and the synchronous notch filter for combining the synchronous torsional oscillation compensation signal and the asynchronous torsional compensation signal.

The synchronous notch filter can include a constant multiplier module coupled to a position sensor, a speed estimator module coupled to the position sensor, and a high-pass filter module coupled to the speed estimator module. It can also include a first low-pass filter module coupled to the high-pass filter module, a second low-pass filter module coupled to the high-pass filter module, and an adder module coupled to the first and second low-pass filter modules for generating an output signal for compensating synchronous torsional oscillations in the WFSG machine.

It is contemplated that the synchronous notch filter can include a multiplier module coupled to the first low-pass filter, a multiplier module coupled to the second low-pass filter, an adder module coupled to each of multiplier modules, and a third adder module coupled to the adder module and the high-pass filter module.

A WFSG machine includes a damping controller as described above, a stationary exciter drive for controlling output voltage of the WFSG machine, and a voltage regulator operably connected to the damping controller and the stationary exciter drive. The stationary exciter receives an exciter drive signal from the voltage regulator for controlling WFSG field current to selectively compensate for torsional oscillation. The damping controller can include a synchronous selective compensator for selection synchronous torsional oscillations. The damping controller can include a synchronous notch filter for asynchronous torsional oscillations selection.

It is also contemplated that a WFSG can include a damping controller as described above, a rotating power converter for controlling output voltage of the WFSG machine, and a voltage regulator operably connected to each of the damping controller and the rotating power converter. The rotating power converter controls output voltage of the WFSG machine to selectively compensate for torsional oscillations using a synchronous selective compensator and a synchronous notch filter.

The synchronous selective compensator can select synchronous torsional oscillations for compensation. It is contemplated that the synchronous notch filter can select asynchronous torsional oscillations for compensation. The rotating power converter can operably connected to the voltage regulator.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the systems and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
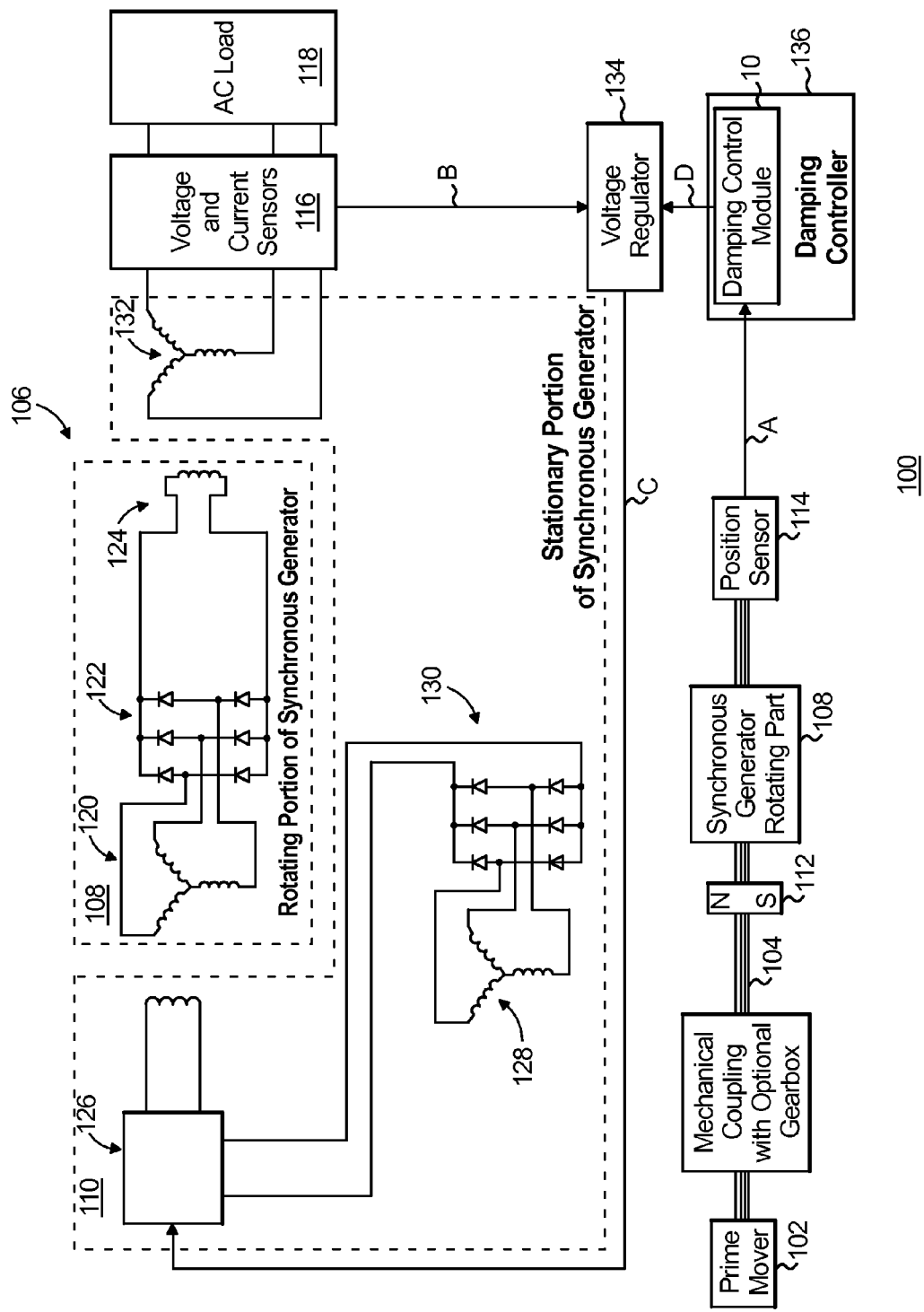
FIG. 1 is a schematic diagram of an embodiment of a wound field synchronous generator (WFSG) machine, showing a damping controller for controlling torsional oscillation.

Reference will now be made to the drawings wherein like reference numerals identify similar structural features or aspects of the subject disclosure. For purposes of explanation and illustration, and not limitation, a view of an exemplary embodiment system for power generation and distribution with active damping control in accordance with the invention is shown in FIG. 1 and is designated generally by reference character 100. Other embodiments of the system in accordance with the disclosure, or aspects thereof, are provided in FIGS. 2-4, as will be described. System 100 can be used for power generation, such as in hybrid vehicles for example.

System 100 includes a prime mover 102, a shaft 104, and a synchronous machine 106 for converting mechanical energy into electrical energy. Shaft 104 includes a permanent magnet (PMG) 112 coupled to shaft 104 and configured to rotate synchronously with shaft 104. Shaft 104 also includes a position sensor 114 operably coupled to shaft 104 and configured and adapted to output a position signal A with shaft positional information, such as shaft rotation angle as a function of time for example.

Synchronous machine 106 is a wound field synchronous generator (WFSG) machine and includes a rotating portion 108 (shown both schematically and as a circuit diagram in FIG. 1) and a stationary portion 110. Synchronous machine 106 generates and supplies electrical power to load 118 through electrical leads. Voltage and current sensor 116 operably couples to the leads and is configured and adapted to output a signal B indicative of voltage and current generated by synchronous machine 106 as a function of time.

Rotating portion 108 of synchronous machine 106 is coupled to shaft 104 through a coupling and optional gearbox for transferring mechanical energy from prime mover 102 to rotating portion 108. Rotating portion 108 includes rotating exciter armature windings 120, a rotating rectifier 122, and a rotating main field winding 124. Rotating exciter armature windings 120 include a plurality of windings for generating an AC current when rotated through a magnetic field generated by stationary portion 110 of synchronous machine 106. Rotating rectifier 122 contains a diode bridge for converting AC current to DC current. Rotating main field winding 124 generates a magnetic field based on supplied DC current that corresponds to both voltage output of synchronous machine 106 and the load imposed on shaft 104 by rotating portion 108 of synchronous machine 106.

Stationary portion 110 of synchronous machine 106 includes stationary main armature windings 132. Stationary main armature windings 132 are electromagnetically coupled to rotating main field winding 124 for generating an AC current as a function of the strength of the magnetic field of rotating main field winding 124. Stationary main armature windings 140 electrically connect to load 118 for powering load 118 through the electrical leads.

Stationary portion 110 of synchronous machine 106 also includes stationary PMG armature windings 128, a stationary rectifier 130, and a stationary exciter drive 126. PMG armature windings 128 are electromagnetically coupled to rotating magnet 112 and electrically connect to stationary rectifier 130. Stationary rectifier 130 includes a diode bridge and electrically connects to stationary exciter drive 126. Stationary exciter drive 126 includes an exciter coil and is configured to generate a magnetic field through which rotating exciter armature windings 120 rotate. Stationary exciter drive 126 is also operably coupled to voltage regulator 134, and operative to modulate the generated magnetic field according to an exciter control signal C provided by a voltage regulator 134. As will be appreciated by those skilled in the art, stationary portion 110 of synchronous machine 106 defines a control loop for maintaining at target voltage output of synchronous machine 106 over a range of shaft rotation speeds. As will also be appreciated, further modulating control signal C with an offset provides a tool for compensating for torsional oscillation in shaft 104 by modifying field current of synchronous machine 106 in response to detected torsional oscillation in shaft 104.

A damping controller 136 having a damping control module 10 is operatively connected to position sensor 114 and voltage regulator 134. Damping controller 136 is configured and adapted to receive position signal A from position sensor 114 and to provide a damping compensation signal D to voltage regulator 134. Damping compensation signal D is generated by damping control module 10 by processing torsional oscillation information in position signal A based on the source of the oscillations, including (i) synchronous torque pulsation induced by a periodic fuel combustion process in prime mover 102, and (ii) asynchronous torque pulsation induced by electrical load due to negative load damping in synchronous machine 106, by providing an damping control signal D to modulate generator field current in response to information indicative of torsional oscillation contained in position signal A. Voltage regulator 134 combines damping compensation signal D with voltage and current sensor signal B to generate exciter control signal C. This changes the load imposed on shaft 104 by rotating portion 108 of synchronous machine 106 that correspondingly offsets torsional oscillation in shaft 104 based on torsional oscillation information present in position signal A. Damping compensation signal D is active in that it changes in magnitude based on detected torsional oscillation.

Figure 2:
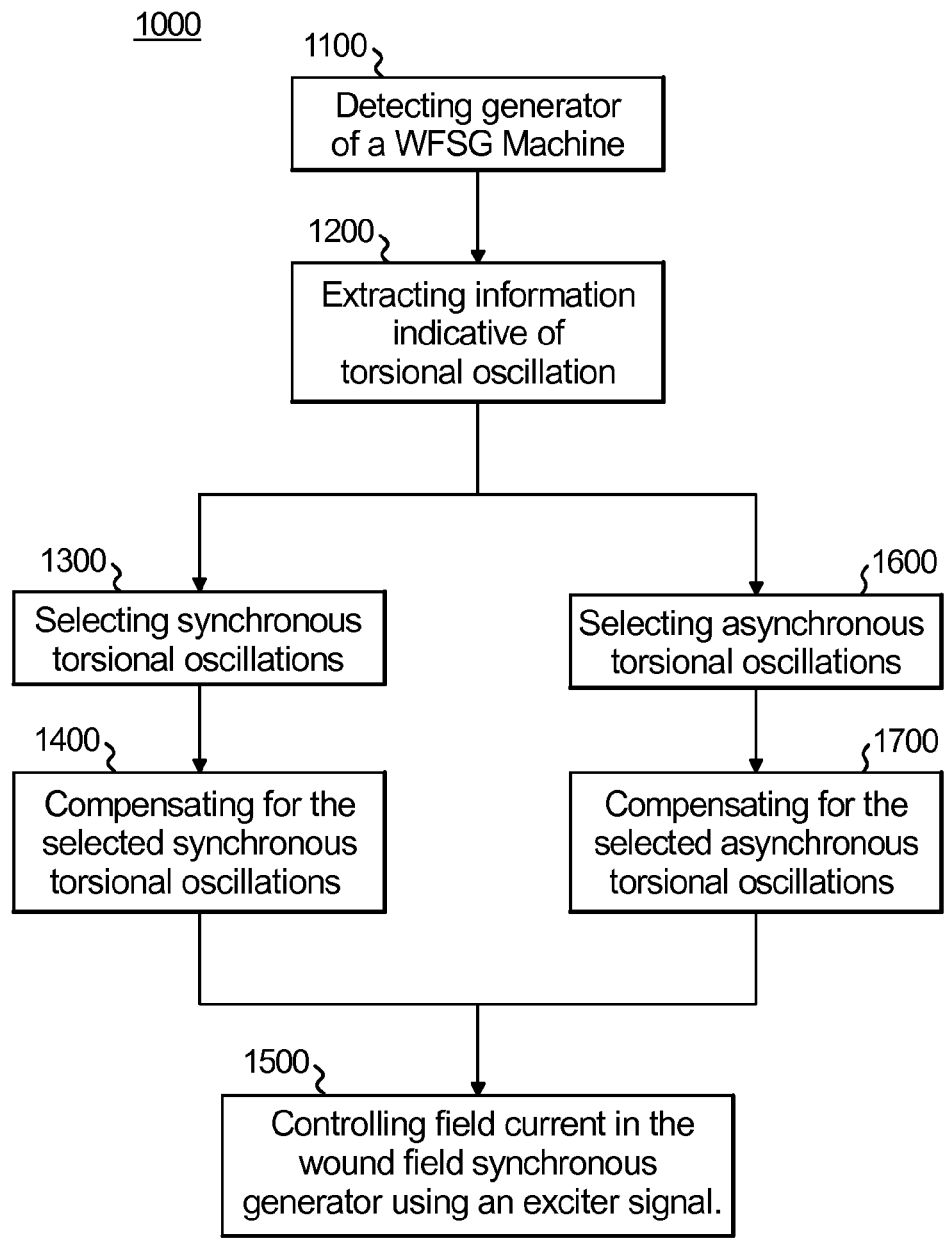
FIG. 2 is flowchart of a method for controlling torsional oscillation in the WFSG machine of FIG. 1, showing selecting and separating compensating for synchronous and asynchronous torsional oscillation.

With reference to FIG. 2, a method 1000 for actively damping torsional oscillation in synchronous machines is shown. Method 1000 includes (a) detecting (1100) angular position of a rotating portion of a WFSG machine; (b) extracting (1200) from the detected angular position of the rotating portion of the WFSG machine information indicative of torsional oscillations in the WFSG machine based on the detected angular position; (c) selecting (1300) synchronous torsional oscillations, for example by using a synchronous selective compensator, from the information indicative of torsional oscillations; (d) compensating (1400) for the selected synchronous torsional oscillations with an exciter, such as by injecting harmonics into a voltage regulator output signal to reduce or cancel synchronous torsional oscillation; and (e) controlling (1500) field current in a rotating main field winding of the WFSG machine with the exciter signal generated by a voltage regular of the WFSG machine. Method 1000 also includes (f) selecting (1600) asynchronous torsional oscillations, for example by using a synchronous notch filter; and (g) compensating (1700) an exciter signal for the selected asynchronous torsional oscillations, for example by injecting a signal into the voltage regulator output signal to reduce or cancel asynchronous torsional oscillations. This expands the bandwidth within which the synchronous machine is damped without incorporating a mechanical device such as a flywheel. It also increases the torsional oscillation frequencies that can be damped.

Figure 3:
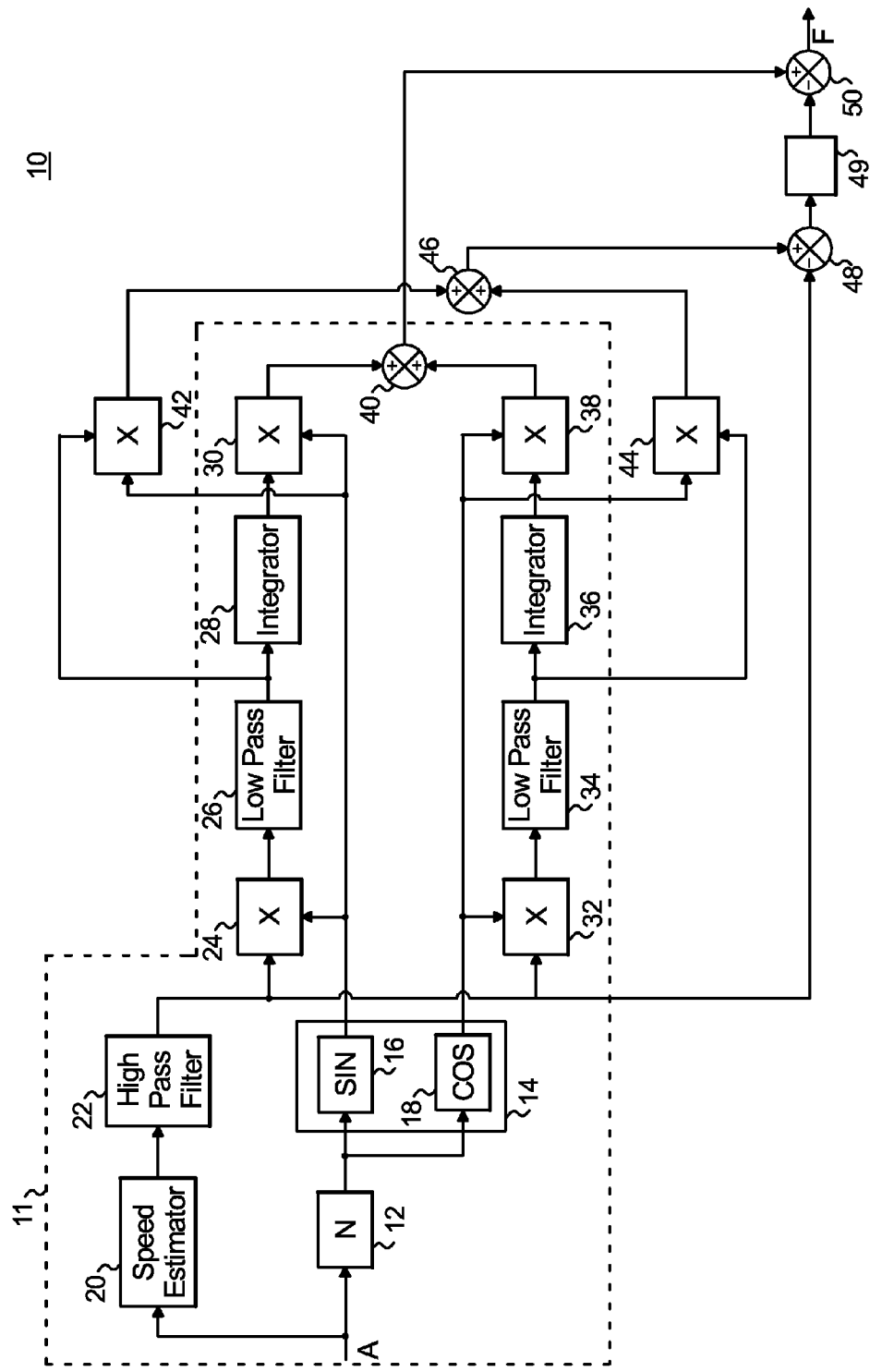
FIG. 3 is a block diagram of the damping controller illustrated in FIG. 1, showing controller modules of a combined synchronous selective compensator and a synchronous notch filter.

With reference now to FIG. 3, a functional block diagram of damping control module 10 is shown. The functional blocks described below operate in similar manner to those described in U.S. Pat. No. 5,218,520 and U.S. Pat. No. 8,056,417, the contents of which are incorporated herein by reference in their entireties. Damping control module 10 has a synchronous selective compensator 11. Synchronous selective compensator 11 has a plurality of modules, including a constant multiplier module 12 communicatively coupled to position sensor 114 for receiving position signal A. A quadrature generator module 14 having a sine channel 16 and a cosine channel 18 communicatively couples to constant multiplier module 12. A speed estimator module 20 communicatively couples to position sensor 114 for receiving position signal A. A high-pass filter module 22 communicatively couples to speed estimator module 20. A first multiplier module 24 communicatively couples to high-pass filter module 20 and sine channel 16 of quadrature generator module 14. A first low-pass filter module 26 communicatively couples to first multiplier module 24. A first integrator module 28 communicatively couples to first low-pass filter module 26. A second multiplier module 30 communicatively couples to first integrator module 28 sine and channel 16 of quadrature generator module 14. A third multiplier module 32 is communicatively coupled to high-pass filter module 22 and cosine channel 18 of quadrature module 14. A second low-pass filter module 34 communicatively couples to third multiplier module 32. A second integrator module 36 communicatively couples to second low-pass filter module 34. A fourth multiplier module 38 communicatively couples to second integrator module 36 and cosine channel 18 of quadrature generator module 14. An adder module 40 communicatively couples to second and fourth multiplier module 30 and 38, providing a signal for modulating exciter control signal C to compensate for the dominant synchronous torsional oscillations present in position signal A.

Operatively, damping control module 10 receives a signal proportional to generator speed that contains information about torsional oscillations. The higher harmonics including torsional oscillations dominant harmonic is selected at the output of high pass filter 22.

A synchronization signal that is used to select and compensate for the dominant harmonic of the torsional oscillation is derived from the generator shaft position be multiplying its signal by a number N and applying a mod 2pi function in constant multiplier 12. This signal is input to quadrature generator 14 to produce sine and cosine signals.

DC components of the dominant harmonic of torsional oscillations are derived at the outputs of multipliers 24 and 32. The higher harmonics are thereafter filtered out by the low-pass filters 26 and 34. Integrators 28 and 36 eliminate steady-state error of each harmonic component, resulting is a new set of DC components at respective output sides of integrators 28 and 36. These DC components of a compensation signal are then converted into sinusoidal compensation signals by multiplying DC components with corresponding signals from quadrature generator 14 in multipliers 30 and 38 and summing them in adder 40. The output is thereafter added to the output of voltage regulator 134 for selectively compensating for synchronous torsional oscillation detected in the angular positional acquired by position sensor 114.

With continuing reference to FIG. 3, damping control module 10 has a synchronous notch filter, including a fifth multiplier module 42 communicatively couples to first low-pass filter 26 and to sine channel 16 of quadrature generator 14. A sixth multiplier module 44 communicatively couples to second low-pass filter 34 and to cosine channel 18 of quadrature generator 14. A second adder module 46 communicatively couples to fifth and sixth multiplier modules 42 and 44. A third adder module 48 communicatively couples to second adder module 46 and high-pass filter 22, providing a signal for modulating exciter control signal C to compensate for asynchronous torsional oscillation present in position signal A. A fourth adder module 50 communicatively coupled to first and third adder modules 40 and 48 combines respective compensation signals for synchronous and asynchronous torsional oscillation as damping control signal D. An optional compensation block 59 may be used between third adder module 48 output and fourth adder module 50 input to improve reduction of asynchronous torsional oscillations. Damping control module 142 thereafter provides damping control signal D to stationary exciter drive 138, modulating output of voltage regulator module 144, and controlling synchronous and asynchronous torsional oscillation actively by monitoring the position of shaft 106 and voltage and current in stationary main armature windings 106.

Asynchronous oscillations are selected from the input signal by rejecting synchronous oscillations using the notch filer and feeding its output back to the voltage regulator via optional asynchronous compensation block 59. This provides active of asynchronous torsional resonances in addition to reduction of synchronous torsional resonances.

Damping control signal D can be combined to generate exciter control signal C by means suitable for an intended application, such as those described in U.S. Pat. No. 7,884,581 and U.S. Pat. No. 8,217,630, the contents of which are herein incorporated by reference in their entireties. As will be appreciated by those skilled in the art, the active damping modules disclosed herein include firmware, e.g. electronics, and/or a processor communicatively connected with a memory and/or non-transitory machine readable media having instructions recorded thereon that, when read by the processor, cause the processor to undertake certain actions.

Figure 4:
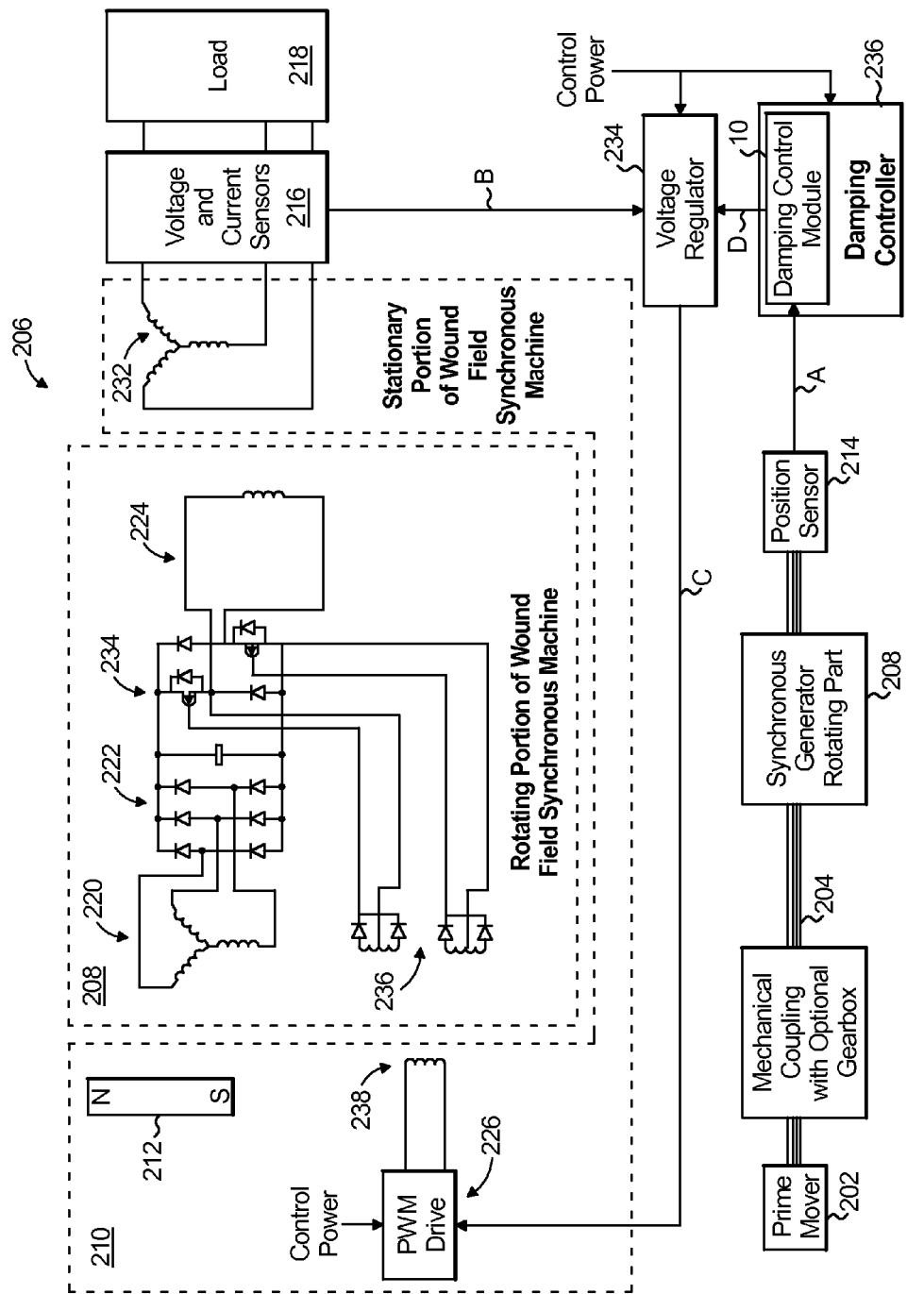
FIG. 4 is a schematic diagram of another embodiment of a WFSG machine, showing a damping controller operable through a rotating power converter of the WFSG machine.

With reference to FIG. 4, a system 200 for power generation and distribution including damping controller 236 is shown. System 200 includes a stationary portion 210 and a rotating portion 208 (shown both schematically and as a circuit diagram in FIG. 4) and is similar to system 100 in many respects.

Shaft 204 does not include a synchronously rotating PMG component. Stationary portion 210 of synchronous machine 206 includes a stationary PMG 212 and a pulse width modulation (PWM) drive 226. Stationary PMG 212 is electromagnetically coupled to rotating exciter armature windings 220 of rotating portion 208 of synchronous machine 206. PWM drive 226 includes stationary primary windings for a rotating transformer. The stationary primary windings are electromagnetically coupled to rotating transformer secondary windings coupled to the rotating portion 208 of synchronous machine 206. PWM drive 226 is operably connected to voltage regulator 234 and configured and adapted to receive exciter control signal D and control power from a control power source, for example from output power of synchronous machine 206 for example.

Rotating portion 208 of synchronous machine 206 includes rotating main field power converter 234 and rotating transformer second windings 236. Rotating main field power converter 234 is electrically connected to rotating rectifier 222 and rotating main field winding 224. Rotating main field power converter 234 is also electrically connected to a rotating gate drive 236. Rotating gate drive 236 is electrically connected to rotating transformer secondary windings, thereby rending PWM drive 226 operatively in control of rotating main field power converter 234 and through which PWM drive 226 modulates DC current supplied to rotating main field winding 224 from rotating rectifier 222. This control effects damping control using position signal A through damping compensation signal D and exciter control signal C as described above.

The methods and systems of the present disclosure, as described above and shown in the drawings, provide systems and methods systems for controlling torsional oscillation in synchronous machines. While the systems and methods of the subject invention have been shown and described with reference to preferred embodiments, those skilled in the art will readily appreciate that changes and/or modifications may be made thereto without departing from the spirit and scope of the subject invention.

What is claimed is:

1. A damping controller comprising:
   a damping module for damping torsional oscillation in a wound field synchronous generator machine,
   wherein the damping module has a synchronous selective compensator for generating a synchronous torsional oscillation compensation signal, a synchronous notch filter for selecting an asynchronous torsional oscillation compensation signal, and an adder module operatively coupled to the synchronous selective compensator and the synchronous notch filter for combining the synchronous torsional oscillation compensation signal and the asynchronous torsional compensation signal, wherein the synchronous notch filter comprises:
   a constant multiplier module coupled to a position sensor;
   a speed estimator module coupled to the position sensor;
   a high-pass filter module coupled to the speed estimator module;
   a first low-pass filter module coupled to the high-pass filter module;
   a second low-pass filter module coupled to the high-pass filter module; and
   an adder module coupled to the first and second low-pass filter modules for generating an output signal for compensating asynchronous torsional oscillations in the wound field synchronous generator machine.

2. A damping controller as recited in claim 1, the synchronous notch filter comprising:
   a multiplier module coupled to the first low-pass filter;
   a multiplier module coupled to the second low-pass filter;
   an adder module coupled to each of multiplier modules; and
   a third adder module coupled to the adder module and the high-pass filter module.

3. A wound field synchronous generator machine, comprising:
   a damping controller as recited in claim 1;
   a stationary exciter drive for controlling output voltage of the wound field synchronous generator machine; and
   a voltage regulator operably connected to the damping controller and the stationary exciter drive,
   wherein the stationary exciter is configured and adapted to receive an exciter drive signal from the voltage regulator for controlling wound field synchronous generator field current to selectively compensate for torsional oscillation.

4. A wound field synchronous generator machine as recited in claim 3, wherein the damping controller includes a synchronous selective compensator is for synchronous torsional oscillation compensation.

5. A wound field synchronous generator machine as recited in claim 3, wherein the damping controller includes a synchronous notch filter for selection of asynchronous torsional oscillations.

6. A wound field synchronous generator machine, comprising:
   a damping controller as recited in claim 1;
   a rotating power converter for controlling output voltage of the wound field synchronous generator machine; and
   a voltage regulator operably connected to each of the damping controller and the rotating power converter,
   wherein the rotating power converter controls output voltage of the wound field synchronous generator machine to selectively compensate for torsional oscillations using the synchronous selective compensator and a synchronous notch filter.

7. A wound field synchronous generator machine as recited in claim 6, wherein the synchronous selective compensator selects synchronous torsional oscillations for compensation.

8. A wound field synchronous generator machine as recited in claim 6, wherein the synchronous notch filter selects asynchronous torsional oscillations for compensation.

* * * * *